(12) United States Patent
Zoppas et al.

(10) Patent No.: US 8,690,562 B2
(45) Date of Patent: Apr. 8, 2014

(54) MOULD FOR THERMOPLASTIC CONTAINERS OBTAINED BY BLOW MOULDING

(75) Inventors: Matteo Zoppas, Conegliano (IT); Andrea Cavalet, Ponte Nelle Alpi (IT); Cristiano Galimberti, Sernaglia Della Battaglia (IT)

(73) Assignee: S.I.P.A. Industrializzazione Progettazione e Automazione S.p.A., Vittorio Veneto (IT)

( * ) Notice: Subject to any disclaimer, the term of this patent is extended or adjusted under 35 U.S.C. 154(b) by 189 days.

(21) Appl. No.: 13/146,856

(22) PCT Filed: Jan. 28, 2010

(86) PCT No.: PCT/EP2010/050995
§ 371 (c)(1),
(2), (4) Date: Jul. 28, 2011

(87) PCT Pub. No.: WO2010/086370
PCT Pub. Date: Aug. 5, 2010

(65) Prior Publication Data
US 2011/0280983 A1     Nov. 17, 2011

(30) Foreign Application Priority Data
Jan. 28, 2009    (IT) .............................. RM2009A0036

(51) Int. Cl.
*B29C 49/48*     (2006.01)

(52) U.S. Cl.
USPC ...................................................... 425/525

(58) Field of Classification Search
USPC ...................................... 425/182, 525, DIG. 5
See application file for complete search history.

(56) References Cited

U.S. PATENT DOCUMENTS

| 5,469,612 | A | 11/1995 | Collette et al. | |
| 2004/0197436 | A1* | 10/2004 | Anderson et al. | 425/527 |
| 2006/0001196 | A1 | 1/2006 | Nahill | |
| 2007/0290413 | A1* | 12/2007 | Tonga | 425/531 |
| 2008/0048406 | A1* | 2/2008 | Arendt et al. | 264/523 |

FOREIGN PATENT DOCUMENTS

| CN | 101 1647634 | 5/2004 |
| WO | WO 2006/051182 A1 | 5/2006 |

OTHER PUBLICATIONS

International Search Report and Written Opinion, Nov. 6, 2010.

\* cited by examiner

*Primary Examiner* — Robert B Davis
(74) *Attorney, Agent, or Firm* — Abelman, Frayne & Schwab

(57) ABSTRACT

A blowing mold with a cam control device for making undercuts related to the application of handles on a container made of plastic material, where the undercuts ensure that the handles are mechanically fixed to the container body and where the system has an independent actuation for each undercut.

8 Claims, 8 Drawing Sheets

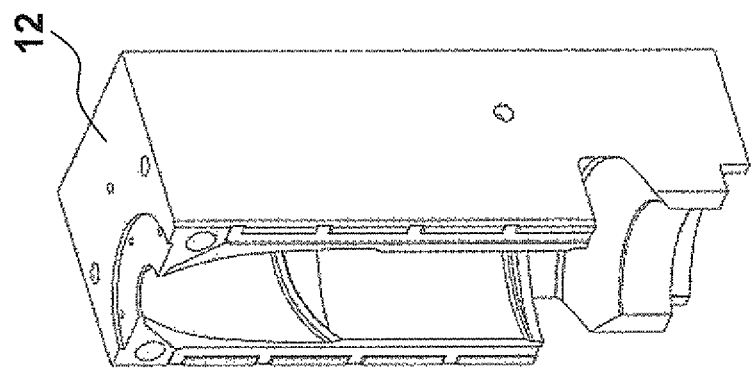
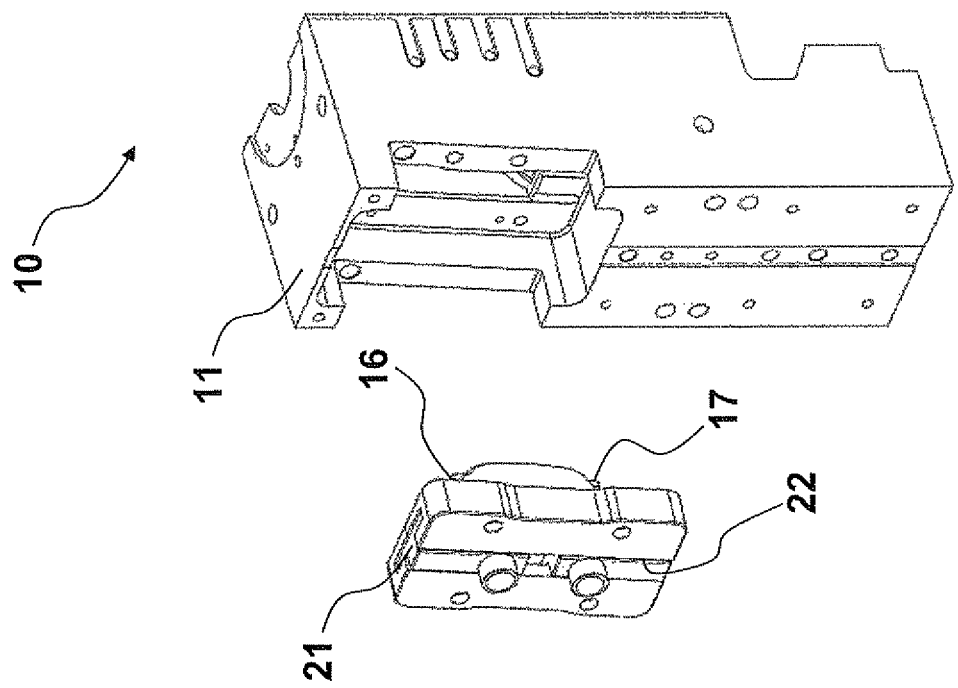
Fig. 1

MOULD FOR THERMOPLASTIC CONTAINERS OBTAINED BY BLOW MOULDING

RELATED CASES AND PRIORITY CLAIM

This application claims priority benefit under 35 U.S.C. §119, 120 and/or 365 of PCT/EP2010/050995 filed Jan. 28, 2010 and Italian application RM 2009A 000036 filed Jan. 28, 2009.

FIELD OF THE INVENTION

The present invention relates to a blowing mold for thermoplastic containers obtained by a stretching-blowing method, having a device for making one or more undercuts for inserting handles on the containers.

STATE OF THE ART

Blowing molds for containers made of thermoplastic material, e.g. PET or other materials for which a similar production process is required, having devices for making undercuts for inserting a handle onto the containers, are found in the prior art. Known devices consist of a wedge which is moved by an actuator, moving in turn two inserts which create one or two recesses within the bottle shape profile. During the blowing operation, the wall of the bottle is pushed by pressurized air about the two recesses, thus forming the undercut(s). The forward movement of the wedge is actuated, for example, either pneumatically or mechanically, and springs are used to return the piston to the resting position. Using a spring for returning the wedge back to its resting position is certainly a disadvantageous point of the device because the springs have a given number of ensured working cycles. The feature of being provided with dragging points to achieve the movement is also certainly detrimental to a long, perfect operation of the device. It is easy to understand that a system in which all moving parts are taken to their resting state only and exclusively by means of return springs requires more power to be able to actuate the forward movement of the whole mechanism.

A further disadvantage of such a device is that it only allows the forward movement of both inserts at the same time within the mold. A consequence of this is that, for particular shapes of bottles, the material distribution and the temperature gradients of the various parts of the bottle wall, e.g. in the zones in which the undercuts are to be obtained, are generally not equal, which has repercussions on the perfect result of the container bottle in a cycle time which allows to exploit the potentials of the machine. The faults may appear in the form, for example, of a perforation of the zones in which the undercut should be obtained, or in the form of undesirable white stains in the same zones or of imperfect formation of the undercut zones, with a consequent instability of the handle after the application thereof, thus causing the rejection of the bottle itself.

An example of cam control device for making one or more undercuts, and related to the application of a handle onto a PET plastic bottle which has the mentioned disadvantages, is described in WO 2006/051182 A1.

The need is therefore felt to provide a mold having a device for making one or more undercuts, which allows to solve the aforesaid disadvantages.

SUMMARY OF THE INVENTION

It is the main object of the present invention to provide a blowing mold comprising a device which allows to make undercuts in a container made of thermoplastic material.

This object is achieved by a blowing mold for thermoplastic material containers which comprises one or more molding shapes, each of which comprises at least two half molds, at least one of the at least two half molds is provided with one or more movable inserts for making undercuts, the inserts being adapted to move with a reciprocating direction motion between an extended position inside one or more of the molding shapes, and a retracted position during the operation, wherein at least one cam moved by actuators is provided, which is adapted to produce the motion of the inserts.

Using cam rods allows more flexibility, first because it frees from using spring systems found in the usual solutions. Such a solution which consists in not impressing a force that "overcomes" the repulsion force of one or more springs certainly also has repercussions in terms of energy consumption of the system for each single production cycle. In all apparatuses of any type, either mechanical, electronic or other, decreasing the number of parts therein increases the reliability of the object itself.

A further advantage of the cam control device concerning the movement of the cams is that the movement is made by means of usual actuators, and thus there is no constraint regarding the use of actuators of other nature, such as for example pneumatic, electro-mechanic, etc. actuators, because the movement actuation apparatus is designed as a self-standing structure with respect to the mold body.

Another feature of non secondary importance concerns the dragging contacts existing between the cams and the corresponding concerned parts. Indeed, these contacts are well-distributed as far the part related to the cam guide with the supporting structure is concerned. Obtaining a well-distributed wear of the concerned parts means more reliability over time, as well as a longer duration of the apparatus itself.

On the other hand, using two cams leads to a series of improvements. Differentiating the control of the two cams implies being able to manage the introduction of the two inserts into the cavities of the two half molds in different times. Accordingly, the obstacle deriving from the different material distributions and temperature differences associated with the production of the two undercuts is solved. In particular, the aforementioned problems which are created during the step of introducing the inserts into the bottle shape are solved.

A further peculiarity deriving from the use of two separate control cams resides in being able to customize the extent of penetration within the cavity, as well as the timing. This variable would allow to remotely make changes, excluding all types of manual interventions on the system, the type of handles to be inserted and thus to vary the final product by simply adjusting the stroke length of each single actuator, as well as the different penetration speeds of the actuators during the blowing cycle.

Another advantage deriving from the use of cams is that of allowing to parallelly extend the production process. By arranging several shapes in parallel, the operation of multiple inserts may be controlled, by only using the actuators required for the movement described heretofore, thus allowing the simultaneous production of several containers.

A further benefit deriving from the application to several half molds is that of allowing to detail the cam profile so that containers with different handles may be produced by differentiating the insert introduction depth in a single system. In particular, if four shapes are available, for example, up to four handle anchoring systems may be produced, and thus four types of containers for each single production cycle may be made if required.

BRIEF DESCRIPTION OF THE DRAWINGS

Further features and advantages of the present invention will be more apparent in the light of the detailed description of preferred, but not exclusive, embodiments of a blowing mold for plastic bottles illustrated, by way of non-limitative example, with the aid of the accompanying drawings, in which:

FIG. 1 is an exploded projected view of a single-cavity mold according to the invention;

DETAILED DESCRIPTION OF A PREFERRED EMBODIMENT OF THE INVENTION

Figure 2:
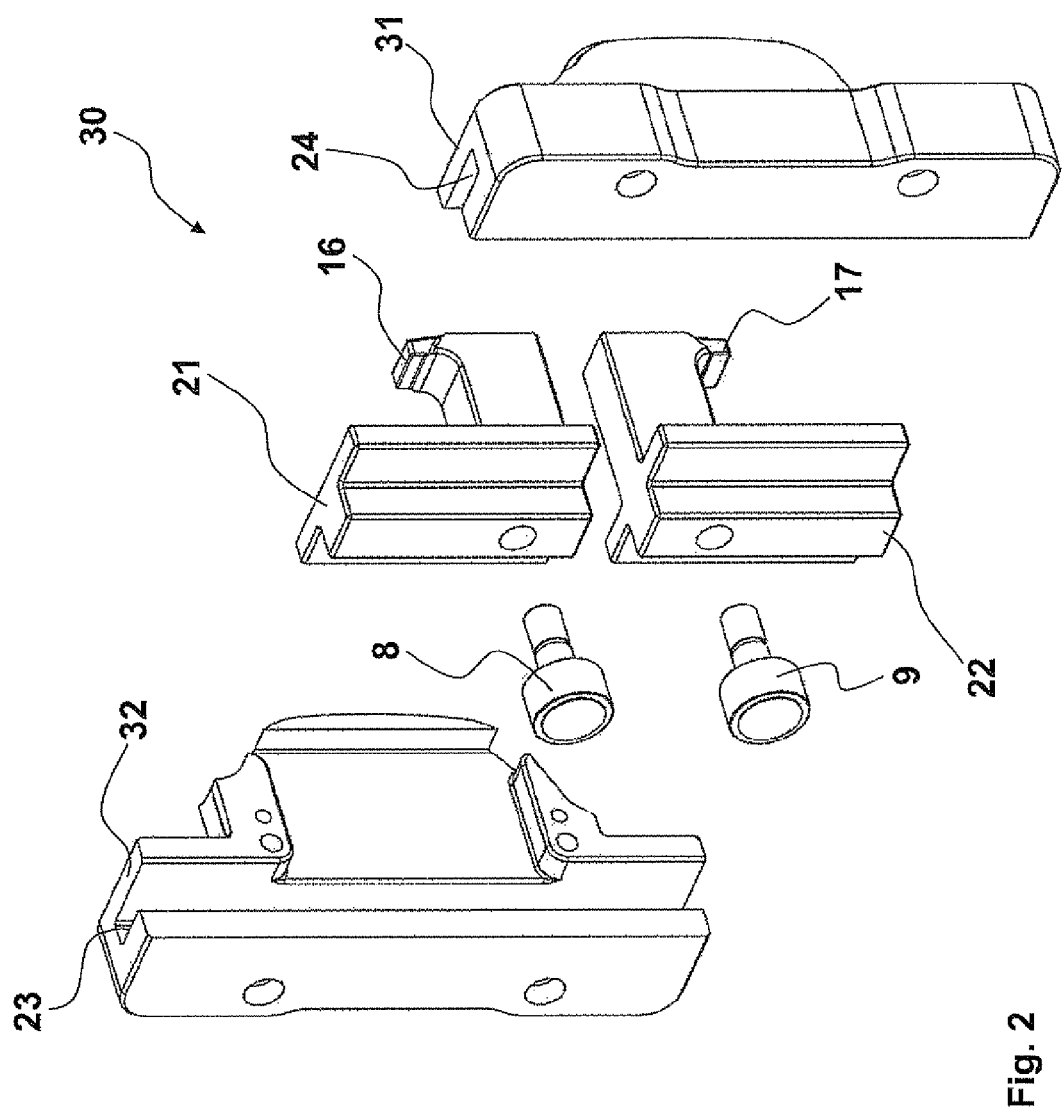
FIG. 2 is an enlarged axonometric view of a detail of the mold of the invention.
Figure 3:
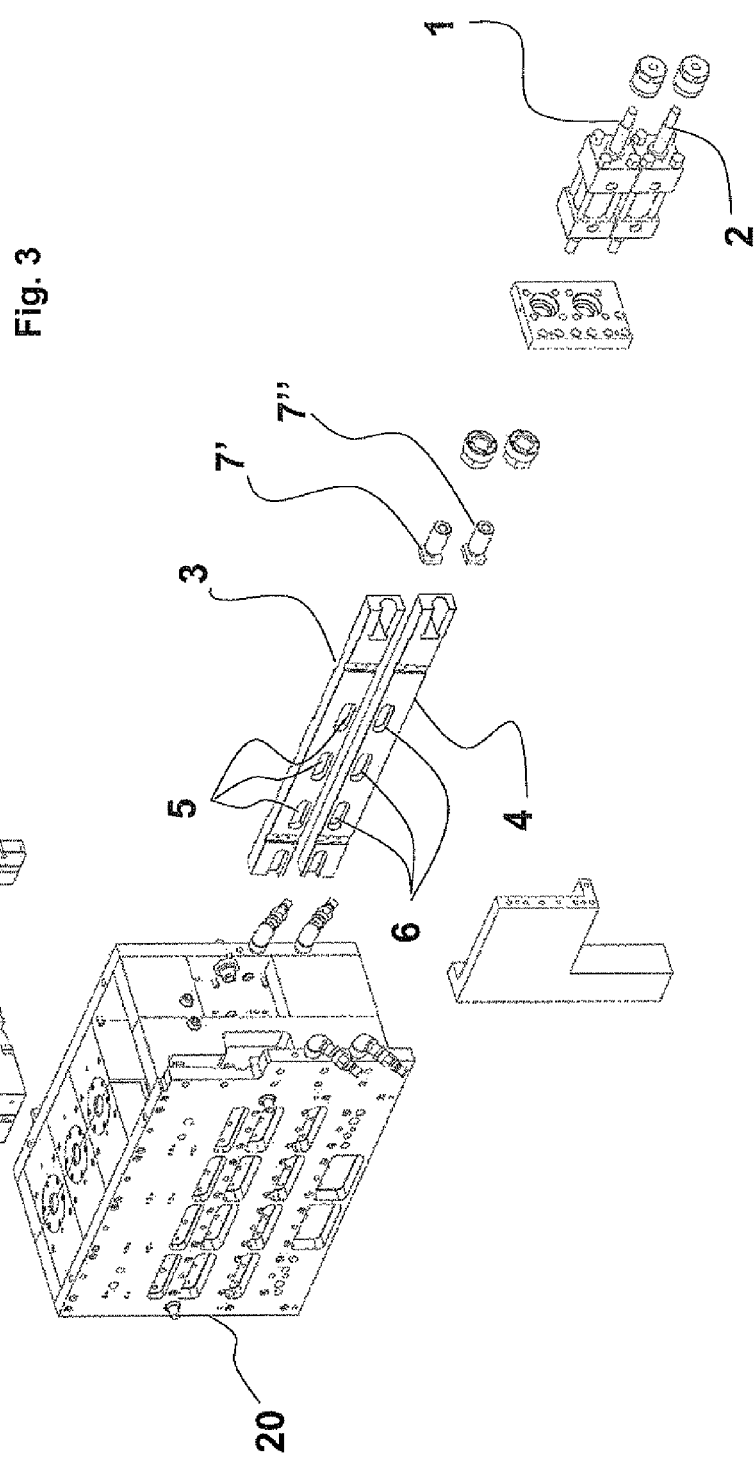
FIG. 3 is an exploded axonometric view of another embodiment of the mold according to the invention.
Figure 4:
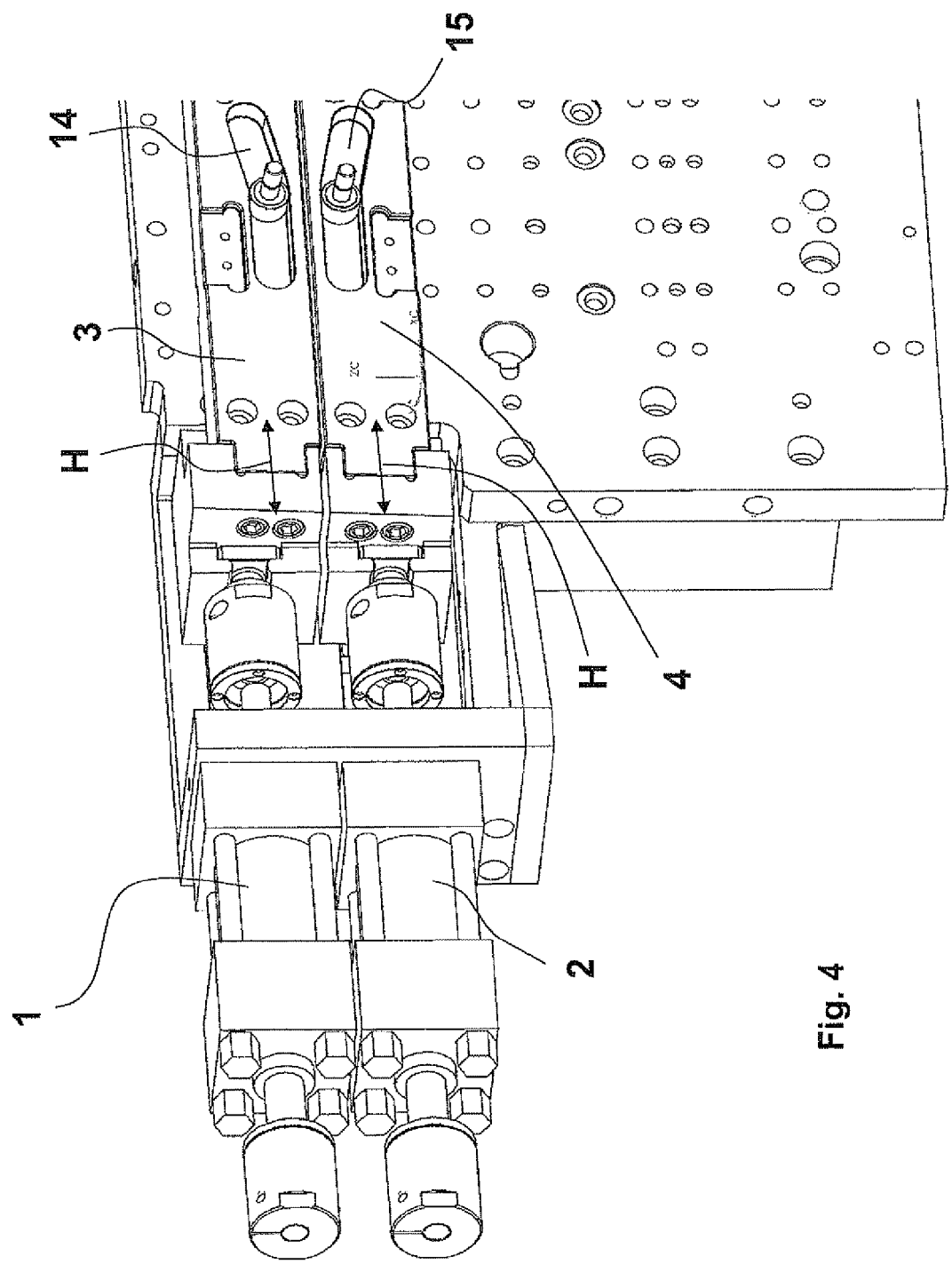
FIG. 4 is a view of an enlarged detail of the mold in FIG. 3, partially assembled.
Figure 5:
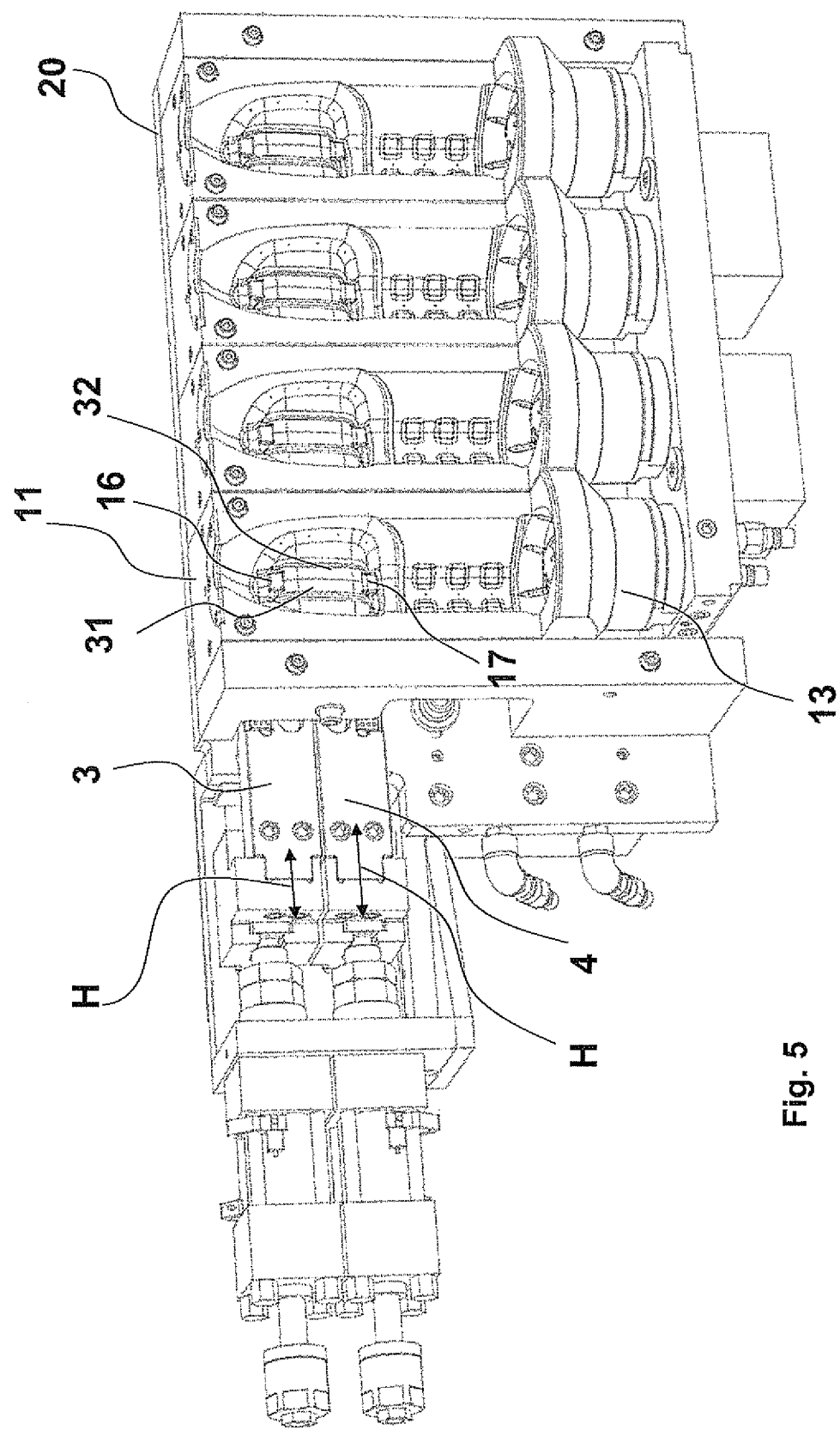
FIG. 5 is a view of an enlarged detail of the mold in FIG. 3, partially assembled.
Figure 6:
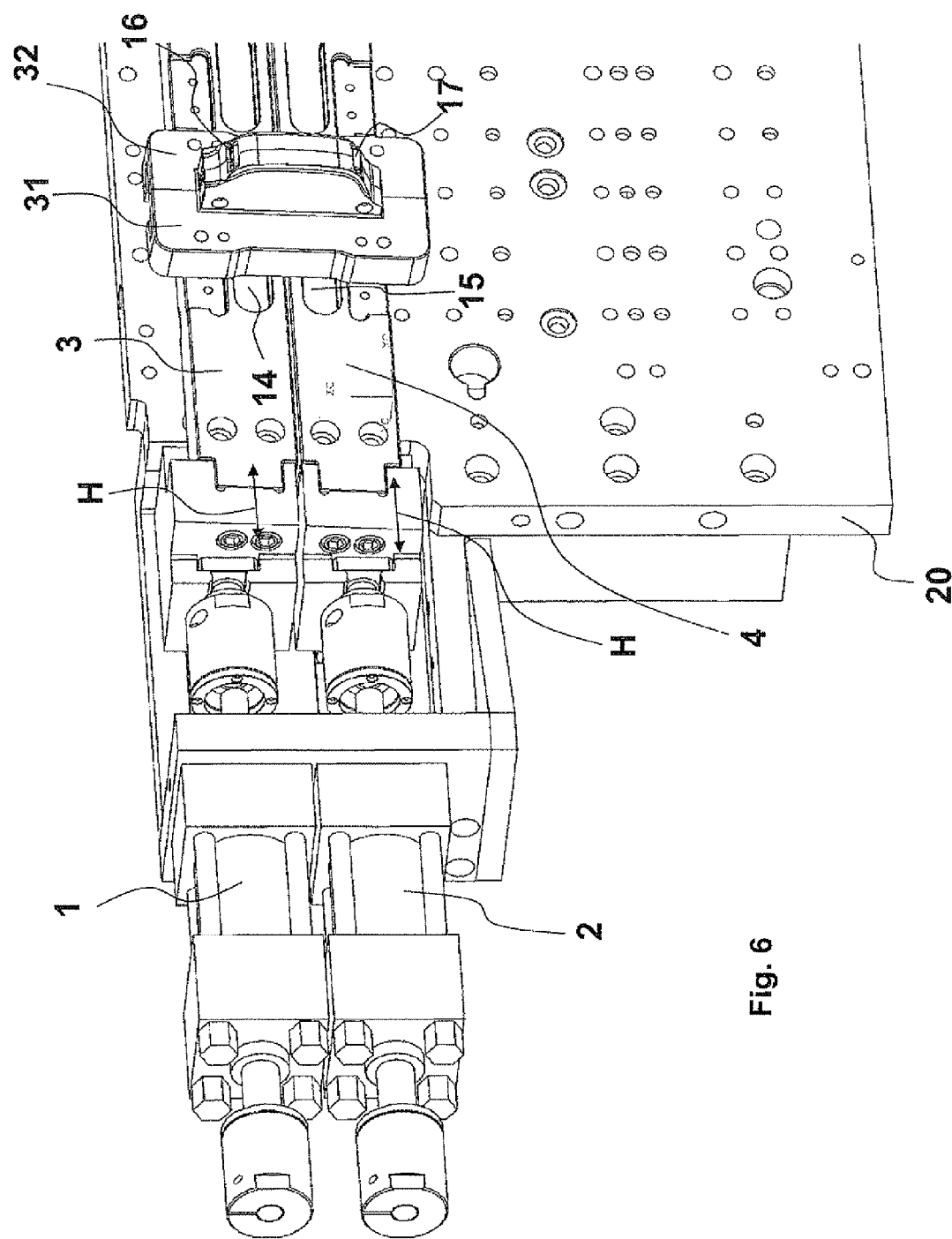
FIG. 6 is a view of an enlarged detail of the mold in FIG. 3, partially assembled.
Figure 7:
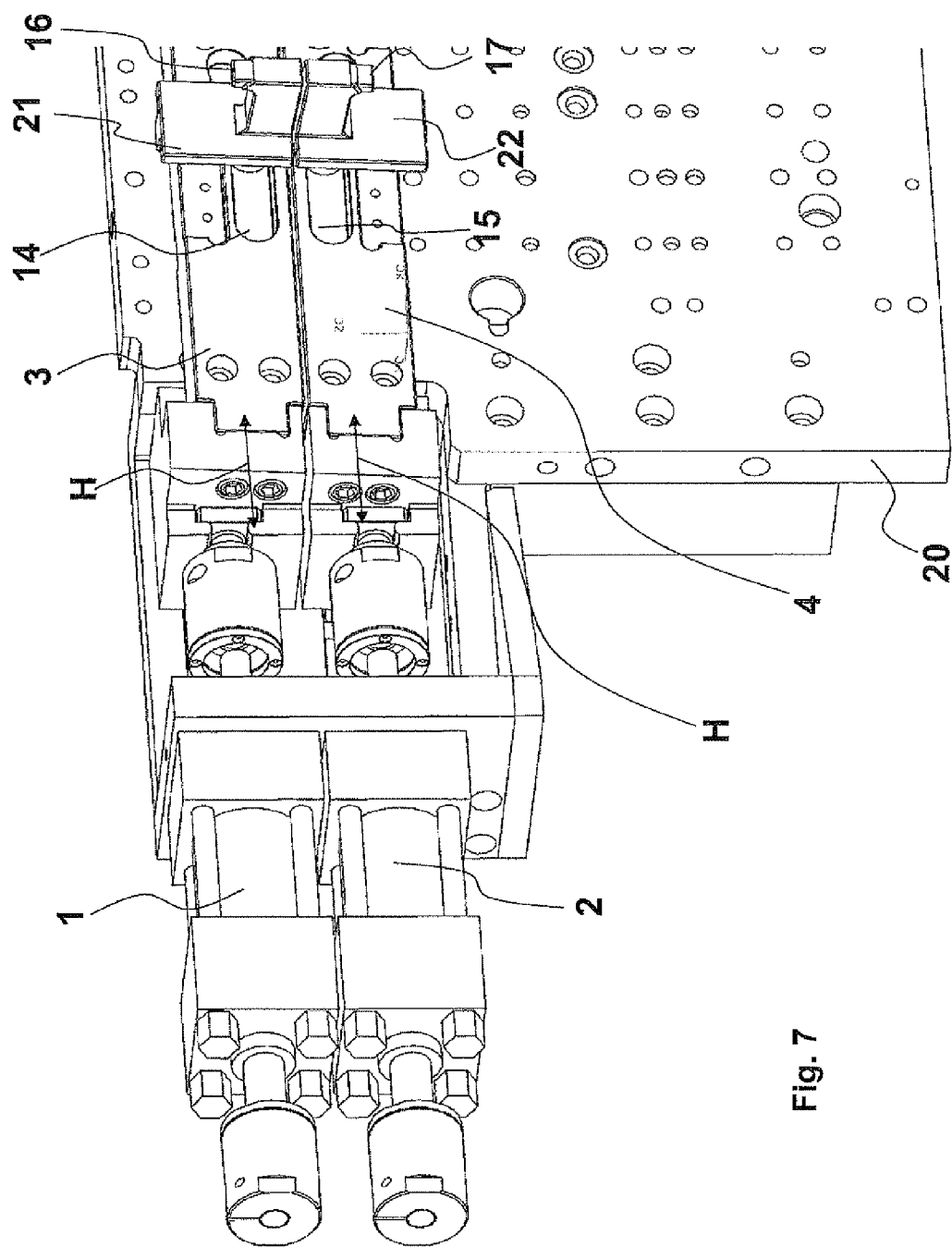
FIG. 7 is a view of an enlarged detail of the mold in FIG. 3, partially assembled, in a first operating position.
Figure 8:
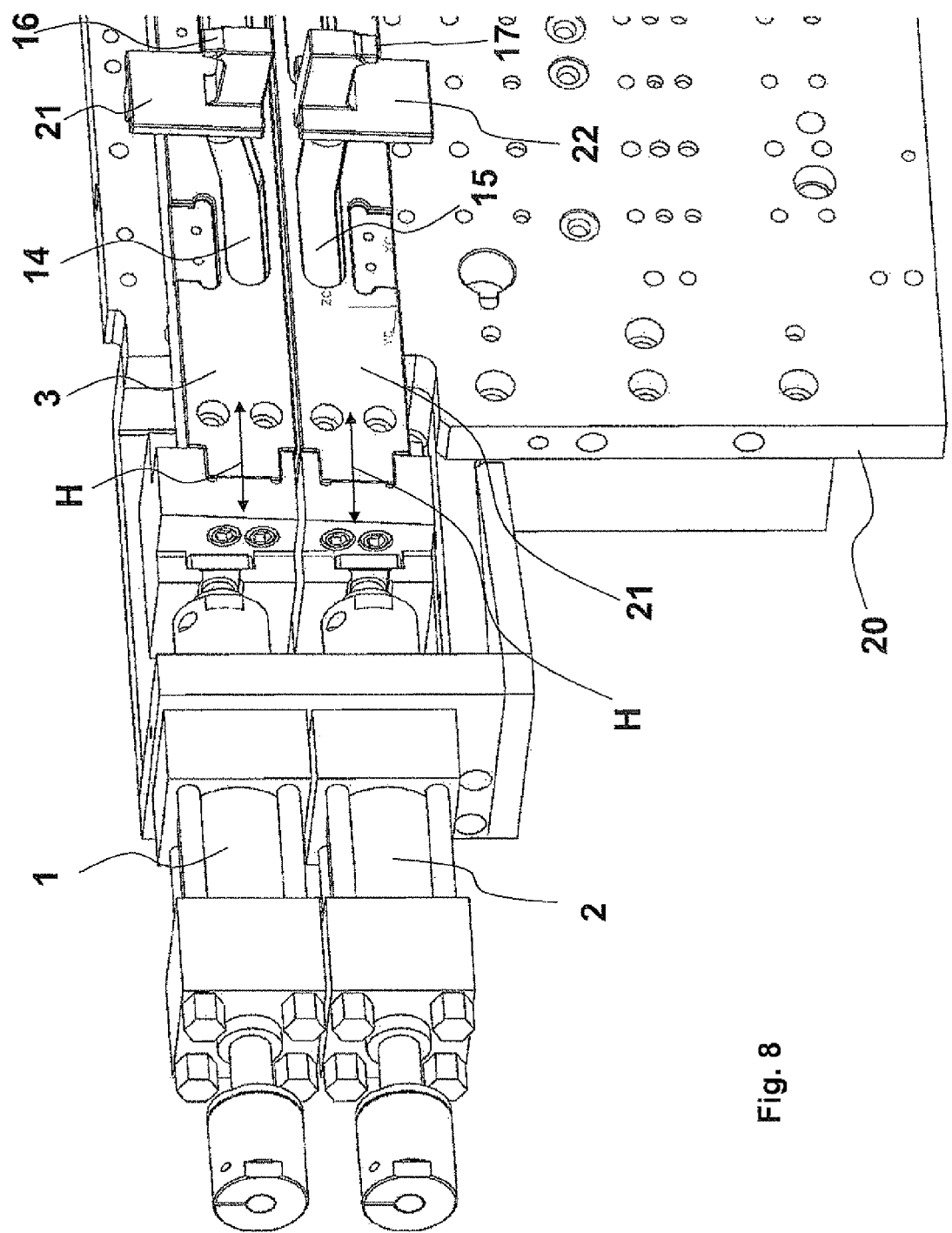
FIG. 8 is a view of an enlarged detail of the mold in FIG. 3, partially assembled, in a second operating position different from that of FIG. 7.

With particular reference to FIG. 3, blowing mold 10 comprises two half molds 11 and 12. In some embodiments of bottles or containers with bottoms of special shape, e.g. concave shape, a third mold element, the bottom 13, is further included. The mold 10 is contained in a frame 20, generally used for a multiple-shape mold, for holding the various shapes together.

Although in this embodiment the mold is intended for blowing bottles, it is understood that the invention may refer to a blowing mold of a container of any shape in which undercut recesses are to be obtained for fixing handles or similar elements. Similarly, though the mold of the invention is mainly intended for blowing containers by stretching-blowing, as common in the production of PET containers, it is understood that it also applies to the blowing of other types of plastics which are molded by stretching-blowing.

The two actuators 1, 2 serve the function of making the two cams 3, 4 perform forward and retraction movements. A mechanical support is provided, which is needed to interface the actuators with the rest of the cam-controlled system. Two joints 7', 7" connect the actuators 1, 2 to the two cams 3, 4 shaped as elongated plates, rods or bars which have appropriate contours on their sides. The contours 6 allow the cams 3 and 4 to be secured to the structure of the mold 10, onto which reaction forces are transmitted, which forces are produced during the sliding movements while the mold 10 is operating. Other contours or shapings 14, 15 on the opposite side of the cams 3 and 4 are used to constrain the movement of cam followers, such as pins 8, 9, integral with slides 21, 22, which support the inserts. The pins 8, 9 transmit the motion impressed by the contours 14 and 15 of cams 3 and 4 to the inserts 16, 17. These contours 14 and 15 are arranged by the side of the cams 3 and 4 facing the inserts 16, 17. These inserts make the undercut seats in the bottles during the blowing operation, which seats are intended for fixing the handles. The pins 8, 9 act as tappets which follow the cam layout when the mold is operating. Ball or roller bearings are advantageously provided on each pin, and in particular in the contact points with the contours of the cams, to decrease the wear effects as much as possible, deriving from the friction between the surfaces in reciprocal motion.

The slides 21 and 22 are slidingly inserted into two guides 23 and 24 produced in two support elements 31 and 32, which are in turn inserted into a cavity by a side of the half mold 11. These support elements 31, 32 form a support for the inserts 16 and 17.

The operation of the blowing mold of the invention occurs with the modes described below.

The two actuators 1, 2 impress a "forward-backward" movement to the two cams by means of the two joints mentioned above. The cams 3, 4 carry out a horizontal movement in the direction of the arrows H. Once the horizontal movement of the cams has been ensured, the remaining pins which are accommodated inside the cam contours impress a vertical movement to the inserts 16, 17. At this point, the horizontal movement of the cams is turned into a vertical movement of the inserts to correctly make the undercuts.

The penetration depth into the cavity of the half molds 11 is adjusted both by the shape of the contours made on the cams 3, 4, and by the length of the stroke impressed by the actuators 1 and 2.

Such a control mode allows many advantages concerning the production of containers to be achieved. First, the possibility of controlling both the times and speed of introducing the inserts 16, 17 inside the cavity of the half molds. This is translated into an optimization of the process of manufacturing the container because possible problems are avoided, which are related to crystallization of the plastic material due to the non-punctual insertion of inserts 16, 17 into the half mold, with a consequent more or less rapid cooling of the container part in points of the mold wall either close to or in contact with the inserts 16, 17, and corresponding non-conformities of the handle seats (undercuts), as previously described.

In particularly advantageous variants of the mold, only one of the inserts is expected to be moved forward, e.g. the lower one 17, in order to make a single undercut for inserting particular types of handles.

In the operating modes of the inserts described heretofore, it is noted that they freely slide following the patterns dictated by the contours of the cams and/or the stroke of the actuators. Not using return springs for the cams or inserts avoids the need to use forces to pull these return springs, thus improving the total efficiency of the actuating device for the inserts 16, 17.

The invention claimed is:

1. A blowing mould for plastic containers comprising one or more moulding shapes, each of which comprises at least two half moulds, wherein at least one of the at least two half moulds is provided with two movable inserts for making undercuts, the two movable inserts being adapted to move with a reciprocating direction motion between an extended position inside the one or more moulding shapes and a retracted position during the operation, wherein there are provided a pair of separate cams, each cam being moved by a separate actuator, adapted to produce the motion of the two movable inserts, wherein said two cams are configured as elongated bars, wherein there are provided shaped grooves on one side of the elongated bars, wherein cam followers integral with the two movable inserts are inserted in the shaped grooves, wherein the shaped grooves are configured so as to produce various introduction times, or various forward movement paths, or various forward movement speeds of the two inserts.

2. The blowing mould according to claim 1, wherein said two movable inserts are exclusively positioned in one of the two half moulds.

3. The blowing mould according to claim 1, wherein a forward movement path of a first of the two movable inserts within the mould is different from a forward movement path of a second of the two movable inserts.

4. The blowing mould according to claim 2, wherein a forward movement speed of a first of the two movable inserts within the mould is different from a forward movement speed of a second of the two movable inserts.

5. The blowing mould according to claim 3, wherein said actuators are hydraulic.

6. The blowing mould according to claim 4, wherein said actuators are hydraulic.

7. The blowing mould according to claim 5, wherein said cam followers are pins.

8. The blowing mould according to claim 6, wherein said cam followers are pins.

* * * * *